(12) United States Patent
Akelbein et al.

(10) Patent No.: US 7,693,884 B2
(45) Date of Patent: Apr. 6, 2010

(54) MANAGING STORAGE SYSTEMS BASED ON POLICY-SPECIFIC PROABILITY

(75) Inventors: Jens-Peter Akelbein, Bodenheim (DE); Jens Fauth, Wiesbaden (DE)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/555,798

(22) Filed: Nov. 2, 2006

(65) Prior Publication Data
US 2007/0255759 A1 Nov. 1, 2007

(30) Foreign Application Priority Data
Jan. 2, 2006 (EP) ................................. 06100011

(51) Int. Cl.
*G06F 12/00* (2006.01)

(52) U.S. Cl. .............................. 707/204; 707/9; 707/10; 707/205; 726/1; 711/161; 711/162

(58) Field of Classification Search ....................... None
See application file for complete search history.

(56) References Cited

U.S. PATENT DOCUMENTS

| 5,790,595 | A  | * | 8/1998  | Benthin et al.    | 375/224  |
|-----------|----|---|---------|-------------------|----------|
| 5,802,301 | A  | * | 9/1998  | Dan et al.        | 709/223  |
| 6,088,767 | A  | * | 7/2000  | Dan et al.        | 711/129  |
| 6,272,612 | B1 | * | 8/2001  | Bordaz et al.     | 711/203  |
| 6,704,753 | B1 | * | 3/2004  | Groetzner et al.  | 707/204  |
| 6,839,803 | B1 | * | 1/2005  | Loh et al.        | 711/113  |
| 6,954,833 | B1 | * | 10/2005 | Yochai et al.     | 711/162  |
| 7,130,866 | B2 | * | 10/2006 | Schaffer          | 707/104.1|
| 7,233,935 | B1 | * | 6/2007  | Chandler          | 706/47   |
| 7,330,997 | B1 | * | 2/2008  | Odom              | 714/6    |
| 2002/0053009 | A1 | * | 5/2002 | Selkirk et al.    | 711/162  |
| 2002/0114341 | A1 | * | 8/2002 | Sutherland et al. | 370/428  |
| 2004/0199566 | A1 | * | 10/2004 | Carlson et al.   | 709/201  |
| 2005/0182900 | A1 | * | 8/2005 | Matsunami et al.  | 711/114  |
| 2007/0033340 | A1 | * | 2/2007 | Tulskie et al.    | 711/108  |
| 2007/0043923 | A1 | * | 2/2007 | Shue              | 711/170  |

* cited by examiner

*Primary Examiner*—Tim T. Vo
*Assistant Examiner*—Hasanul Mobin
(74) *Attorney, Agent, or Firm*—John E. Campbell (57) ABSTRACT

The invention relates to a method and data processing system of managing a storage system, wherein the storage system comprises a first storage space and a second storage space, wherein the first storage space comprises a plurality of files, wherein for each file of said plurality of files at least one attribute is specified, and wherein a policy is assigned to each attribute. The method comprises the steps of determining a policy-specific probability distribution for each policy and of determining a policy-specific probability for each file by use of the policy-specific probability distribution. The method further comprises the step of determining a total probability for each file by use of each policy-specific probability and of moving each file of the plurality of files having a total probability equal to 1 from the first storage space to the second storage space. The method further comprises the step of moving files of the plurality of files having a total probability between 0 to 1 if the storage space used on the first storage space reaches a high threshold value until a low threshold value is reached, wherein the low threshold value and the high threshold value are predetermined.

20 Claims, 4 Drawing Sheets

MANAGING STORAGE SYSTEMS BASED ON POLICY-SPECIFIC PROABILITY

FIELD OF THE INVENTION

The invention relates to a method and a data processing system for managing a storage system is general and to a method and data processing system for managing a storage system comprising high speed and slower storage devices in particular.

BACKGROUND AND RELATED ART

Storage systems are systems that are used to mange and to store files. A storage system usually comprises several storage devices, whereof some are high speed storage devices such as hard disc drives and whereof others are slower storage devices such as tape drives. In principle, it is preferable to keep all files on high speed storage devices so that these files can be provided quickly to an application which requests any of these files. However slower storage devices are less expensive than high speed storage devices so equipping a storage system with slower storage devices leads to more cost efficient storage systems.

A storage system needs to mange the files that are held by the storage devices of the storage system. A storage system uses various concepts in order to decide if a file is placed on a fast storage device or on a slower storage device. For storage systems the concepts of policies by which it is decided where a file is stored, is well known. This concept was introduced by the data facility storage management system (DFSMS) which is a commercial system for IBM Corporation on zOS. The Tivoli Storage Manager which is also part of a commercial storage system from IBM Corporation provides also similar policy based storage management for backup and archives.

A policy generally refers to an attribute of a file and describes an action that is performed on the file depending on the attribute. For example, the storage system could consist of a tier 1 storage and a tier 2 storage. All old files should be placed on the tier 2 storage, which is a relative cheap storage media, while all files that are younger than a specific point in time should be placed on the tier 1 storage. A policy based on the attribute of file age could than be: 'move all files older than 100 days from the expensive (tier 1) storage device to the cheap (tier 2) storage device'.

Another example of a policy that controls the distribution of files with various sized could be: 'move files larger than 10 GB from the tier 1 storage device to the tier 2 storage device'. Both policies can be combined so that only files older than 100 days and larger than 10 GB are moved from one storage device to the other.

Another concept of managing the distribution of files on various storage devices is called hierarchical storage management (HSM). The Tivoli Storage Manger for space management for example employs the concept of hierarchical storage management. The Tivoli Storage Manager for space management monitors the used capacity of file system that is distributed between, for example, a tier 1 storage device and a tier 2 storage. If a high threshold value of used capacity on the tier 1 storage is reached files are moved to the tier 2 storage until the used capacity on the tier 1 storage reaches a low threshold value. This means however, that a file that could be moved due to a policy might nevertheless remain on the tier 1 storage. For example, a file that is older than 100 days could be moved according to the policy given about but resides on the tier 1 storage device as long as there is sufficient storage space available on the tier 1 storage device.

Even worse becomes the situation if the tier 1 storage is filled up to 100% of its capacity and no file is eligible to be migrated to the tier 2 storage because each file is required to remain stored on the tier 1 storage due to a policy. For example the distribution of files between the tier 1 storage and the tier 2 storage is managed by the policy that files older than 100 days should be moved to the tier 2 storage. If no file is older than 100 days, then no file is moved even if the used capacity of the tier 1 storage is 100%. The implementation of Tivoli Storage Management hierarchical storage management solves this problem by applying a score based policy. An individual score is computed for each file by using: score=file age×age factor+file size×size factor. The factors for age and size can be used to adjust the influence of age and size of a file for its eligibility criteria. Candidates for file movement are now selected by their score so files with the highest score get moved first while files with a low score reside on the expensive media. This avoids an out of space condition for a file system but it does not give the system administrator the ability anymore to define exact age or sizes of a file for becoming eligible to be moved.

There are therefore two concepts of managing a storage system. One concept triggers the migration of files based on policies while the other triggers the migration of files based on the used storage of the high speed storage devices. The two concepts can however not be combined without interference between each other. There is therefore a need for an improved method and data processing system of managing a storage system.

SUMMARY OF THE INVENTION

In accordance with an embodiment of the invention, there is provided a method of managing a storage system, wherein the storage system comprises a first storage space and a second storage space, wherein the first storage space comprises a plurality of files, wherein each file of the plurality of files is characterized by at least one attribute, wherein the storage system further assigns a policy to each attribute, and wherein the method comprises the step of determining a policy-specific probability distribution for each policy and determining a policy-specific probability for each file by use of the policy-specific or ability distribution. The method further comprises the step of determining a total probability for each file by use of each policy-specific probability and the step of moving each file of the plurality of files having a total probability equal to 1 from the first storage space to the second storage space. The method comprises also the step of moving files of the plurality of files having a total probability between 0 and 1 if the storage space used on the first storage space reaches a high threshold value until a low threshold value is reached, wherein the low threshold value and the high threshold value are predefined.

Each file of the plurality of files is characterized by at least one attribute. A policy for each attribute is defined and for each policy, a policy-specific probability distribution is determined. For the policy-specific probability distribution, a policy-specific probability is determined for each file. From all policy-specific probabilities a total probability can be determined for each file. Based on the total probability it is determined if a file is moved from the first storage space to the second storage space.

The method in accordance with the invention is particularly advantageous as both concepts, the policy-based concept and the capacity usage concept are employed without interfering each other. Files with the total probability of 1 are migrated independent of the available storage on the first storage space, while files with the total probability between 0 to 1 are moved when the used capacity on the first storage space increases beyond the highest threshold value. Moreover files with the probability of 0 are not considered to be migrateable.

In accordance with an embodiment of the invention the total probability of a file is equal to 1 if at least one policy-specific probability of the file equals to 1 and the total probability for a file is equal to 0 if at least one policy-specific probability of the file is equals to 0. The total probability of a file is determined by adding the policy-specific probabilities of each file, wherein each policy-specific probability is multiplied by a preferred weight factor if all policy-specific probabilities of the file are in the range between 0 to 1. If any one of the policy-specific probabilities of a file equals 1, then the total probability of the file is determined to be 1 which means that the file is migrated from the first storage space to the second storage space. Moreover if at least one policy-specific probability of a file equals 0, then the total probability for that file is determined to be 0 which means that this file is not migrated from the first storage space to the second storage space. If the total probability is determined by adding the policy-specific probabilities of each file, then the probability is also determined in the way that the result is between 0 and 1. This can for example be done by normalizing the total probabilities to a maximum value. These files for which the total probability lies in the range between 0 and 1 are eligible candidates for migration and they are possibly migrated when the storage space on the first storage space reached a high threshold value.

In accordance with an embodiment of the invention, files are moved from the plurality of files if the storage space used on the first storage space reaches a high threshold value until a low threshold value is reached and if the total probability of all files comprised in the plurality of files is equal to 0. This means that the policy-based concept is switched off, when all files have a probability of zero. This has the advantage that when all files have a probability of 0, which means that all files are supposed to stay on the first storage device according to the policy, these files are nevertheless moved to the second storage device when the capacity used on the first storage device reaches a high threshold value. This prevents that the policy-based concept interferes with the space usage concept.

In accordance with an embodiment of the invention, the files with a higher total probability are moved before files with a lower total probability. This relates in particular to the case where files with a probability between 0 to 1 are moved after the capacity used on the first storage device reaches the highest threshold value. Then files with the higher probability are moved before files with the lower probability until the capacity used on the first storage space reached the lowest threshold value.

In accordance with an embodiment of the invention, the total probability of a file equals the policy-specific probability of the file, if only one attribute characterizes the file.

In accordance with an embodiment of the invention, the attribute refers to the age of a file or to the size of a file.

In accordance with an embodiment of the invention, the policy-specific probability distribution for each policy is determined by a transformation, wherein the transformation is characterized by a relational number, and wherein the relational number lies in the range between −1 and +1.

In accordance with an embodiment of the invention, the attribute refers to a file name, and wherein the policy-specific probability distribution of the policy that is assigned to the file name is predefined.

In accordance with an embodiment of the invention, the first storage space is a tier 1 storage and the second storage space is a tier 2 storage.

In accordance with an embodiment of the invention, a business value for a file is given by one minus the total probability of the file, and the business value of each file is used to compare files with each other.

In another aspect the invention relates to a computer program product comprising computer executable instructions for performing the method in accordance with the invention.

In another aspect the invention relates to a data processing system for managing a storage system, wherein the storage system comprises a first storage space and a second storage space, wherein the first storage space comprises a plurality of files, wherein each file of the plurality of files is characterized by at least one attribute, wherein the storage system further assigns a policy to each attribute, and wherein the data processing system comprises means for determining a policy-specific probability distribution for each policy and means for determining a policy-specific probability for each file by use of the policy-specific probability distribution. He data processing system further comprises means for determining a total probability for each file by use of the policy-specific probability and means for moving each file of the plurality of files having a total probability equal to 1 from the first storage space to the second storage space. The data processing system further comprises means for moving files of the plurality of files having a total probability between 0 and 1. If the storage space used on the first storage space reaches a high threshold value until a low threshold value is reached, wherein the low threshold value and the high threshold value are predefined.

BRIEF DESCRIPTION OF THE DRAWINGS

In the following, embodiments of the invention will be described by way of example only making reference to the following drawings in which.

DETAILED DESCRIPTION

Figure 1:
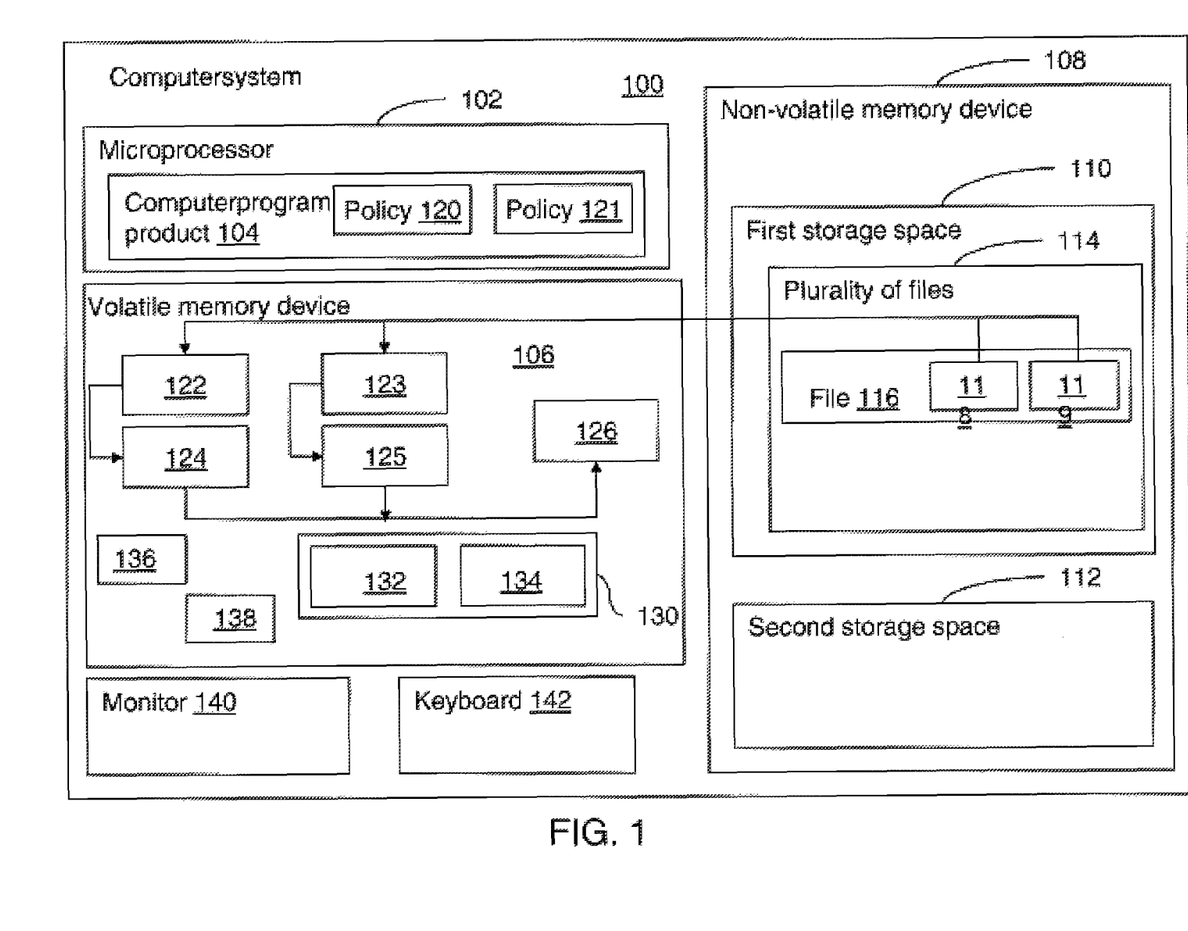
FIG. 1 shows a block diagram of a computer system hosting a storage system.

FIG. 1 shows a block diagram of a computer system 100 hosting a storage system. The computer system 100 comprises a microprocessor 102, a volatile memory device 106, a non-volatile memory device 108, a monitor 140, and a keyboard 142. The non-volatile memory device 108 comprises a first storage space 110 and a second storage space 112. The first storage space 110 holds a plurality of files 114. File 116 is contained in the plurality of files 114. As each file, file 116 is characterized in this example by two attributes, by attribute 118 and by attribute 119. The microprocessor 102 executes a computer program product 104 which comprises instructions for performing the method in accordance with the invention. The computer program product 104, the first storage space 110, and the second storage space 112 are components of the storage system.

A policy 120 is defined which refers to the attribute 118. Another policy 121 is defined that refers to the attribute 119. For each policy 120, 121, respectively a policy-specific probability distribution 122, 123, respectively is determined. For each file of the plurality of files 114 a policy-specific probability is further determined by use of the corresponding probability distributions 122 and 123. For example, for file 116 a policy-specific probability 124 is determined by use of the policy-specific probability distribution 122 and by taking into account the attribute 118 of the file 116. Moreover, a policy-specific probability 125 is determined for file 116 by use of the policy-specific probability distribution 123 and taking into account the attribute 119 of the file 116.

A total probability 126 for each file is derived from the policy-specific probabilities 124 and 125. Each file of the plurality of files 114 for which the total probability is 1 is moved from the first storage space 110 to the second storage space 112.

The available storage space on the first storage space 110 is monitored and the corresponding value representing the used storage space 130 is stored on the volatile memory device 106. A high threshold value 132 and a low threshold value 134 is specified for example by a system administrator. The computer program product 104 could for example request the system administrator for specifying these values by visualizing the request on the monitor 140. The system administrator could then provide the highest threshold value 132 and the lowest threshold value 134 for example by use of the keyboard 142 to the computer system 100. The high threshold value 143 and the low threshold value 134 are then stored on the volatile memory device 106 or alternatively on the non-volatile memory device 108.

All files with the probability between 0 and 1 are moved from the first storage space 110 to the second storage space 112 if the value for used storage space on the first storage device 130 increases beyond the high threshold value 132 until the value for the used storage space 130 drops below the low threshold value 134. Typically, files with higher probability are moved first. In an embodiment, the total probability 126 of a file, for example of file 116, is determined to be equal to 1 if one policy-specific probability 124 or 125 of the file 116 equals to 1. This implies that the file 116 would be moved from the first storage space 110 to the second space 112. Accordingly, the total probability 126 of file 116 is equal to 0 if one policy-specific probability 124 or 125 of the file 116 equals to 0. This implies that the file 116 would remain on the first storage space 110. The total probability 126 in all other cases is further determined by adding the policy-specific probabilities 124, 125 of the file 116, wherein each policy-specific probability 124, 125 is multiplied by a weight factor 136, 138, respectively. In order to ensure that the total probability 126 remains in the range between 0 to 1 the sum is be divided by a normalization factor. For example, if the sum is formed of two policy-specific probabilities then the sum could be divided by the factor of 2 in order to ensure that the total probability 126 remains in the range between 0 to 1. The weight factors 136 and 138 could be specified by the system administrator.

The first storage space 110 and the second storage space 112 could for example be allocated on a single non-volatile memory device 108 as shown in FIG. 1. The non-volatile memory device 108 could then be a hard disc drive, on which the first storage space 110 refers to one partition and the second storage space 112 refers to another partition in which all files are stored for example in a compressed way. The first storage space 110 could also be a hard disc drive, whereas the second storage space could be a tape drive or any other slower storage devices. The two drives would then be connected for example by an internet connection. The first storage space 110 could also be a tier 1 storage and the second storage space 112 could be a tier 2 storage of a storage system. In principle, the files could also be distributed on several high speed and low speed devices and the method in accordance with the invention is used to migrate files from high speed storage devices to low speed storage devices.

Figure 2:
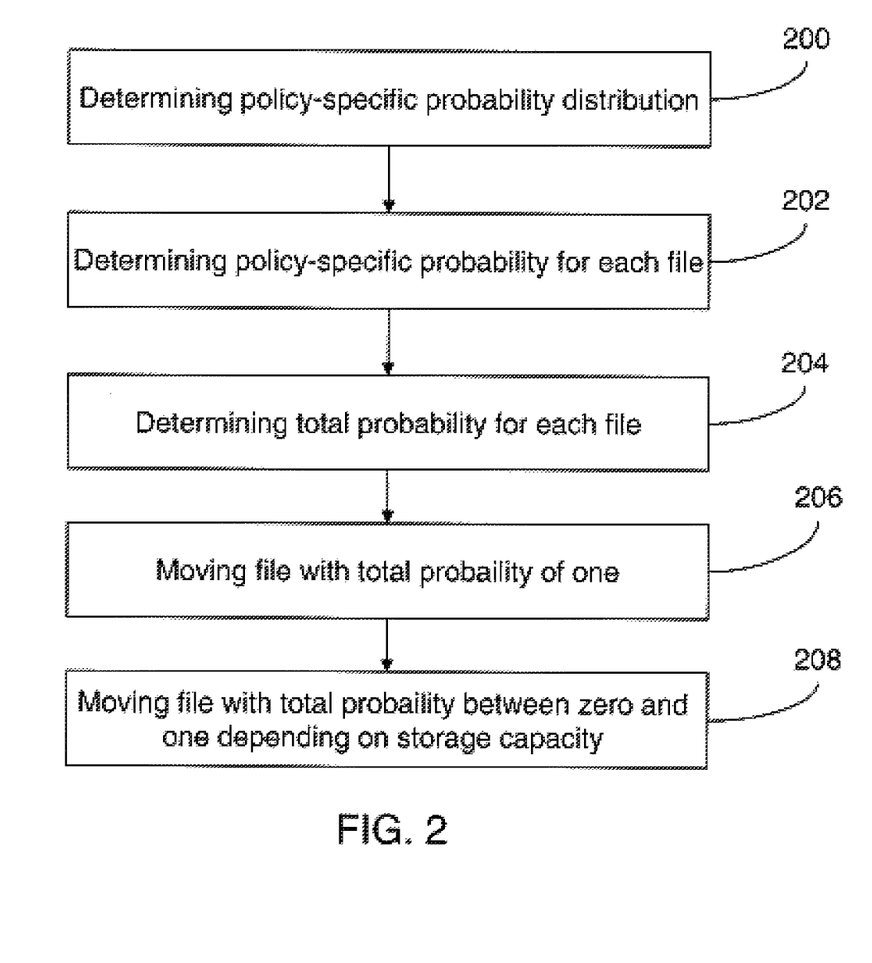
FIG. 2 shows a flow diagram depicting the basic steps of the method in accordance with the invention.

FIG. 2 shows a flow diagram that illustrates the basic steps for performing the method in accordance with the invention. In step 200 a policy-specific probability distribution is determined for each policy. In step 202 a policy-specific probability is determined for each file by use of the policy-specific probability distributions. In step 204 a total probability is determined for each file by use of the policy-specific probabilities that have been determined in step 202 for each file. In step 206, files with a total probability of 1 are moved from the first storage device to the second storage space. In step 208 files with the total probability between 0 to 1 are moved from the first storage space to the second storage space, when the capacity used in the first storage space reaches a high threshold value until a low threshold value is reached.

Figure 3:
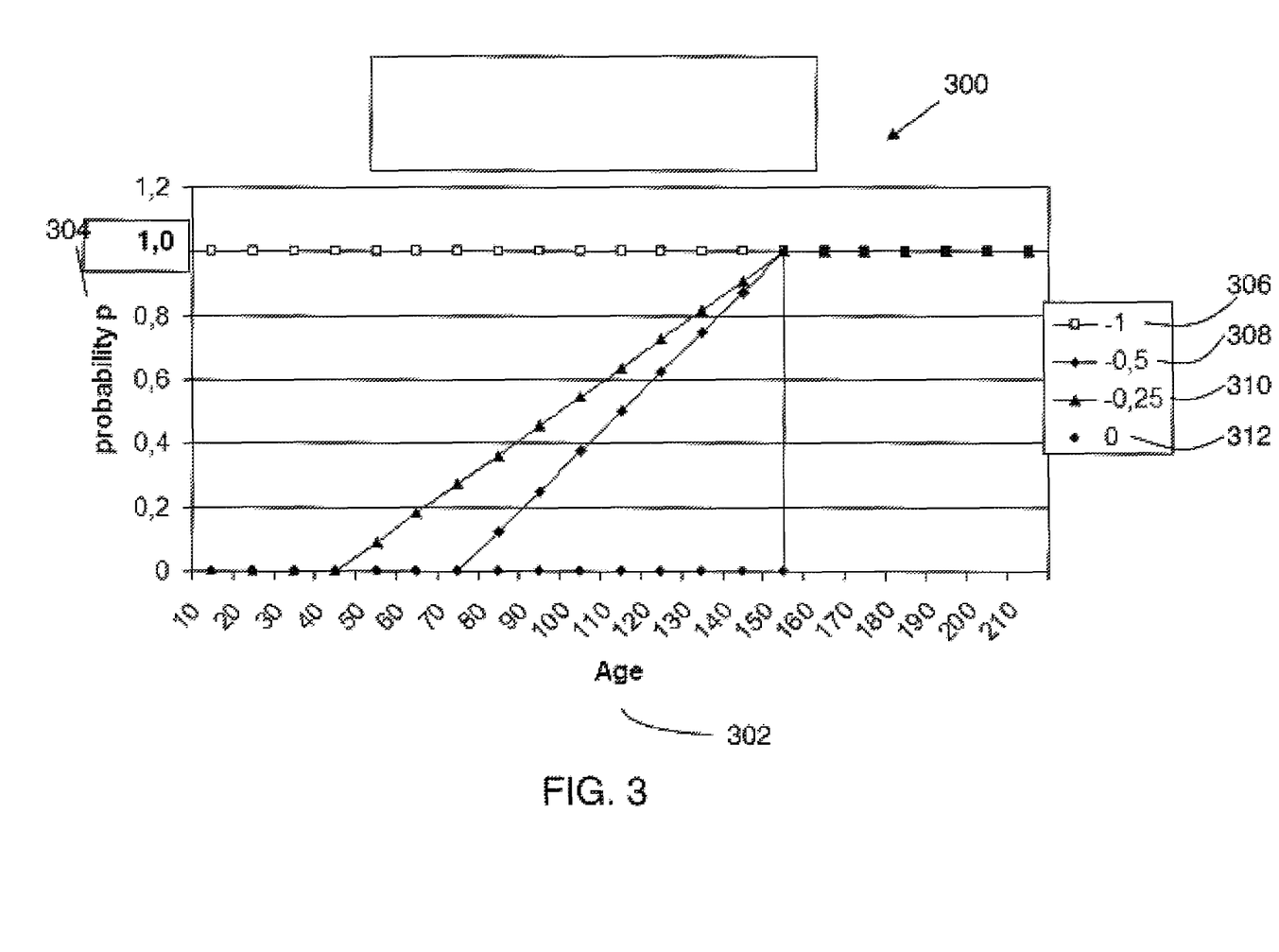
FIG. 3 illustrates how the policy-specific probability distribution is determined by use of a transformation.

FIG. 3 illustrates how the policy-specific probability distributions 300 of a policy are determined by use of a transformation. In this example, the attribute that is assigned to each file is the file age. The policy specifies to move each file older than 150 days from the first storage space to the second storage space. The Boolean formulation: move file is true, if file older than 150 days; move file is false, if file younger than 150 days, is transformed into a probability distribution by use of a transformation which is characterized by a relation number $t_£=[-1, 1]$ which is comprised in the interval between −1 and +1, inclusively. The policy-specific distribution 300 is a function of the probability shown on the y-axis 304 over the file age 302.

The probability distribution of the policy is represented the probability distribution 312, which corresponds to a transformation with $f_£=0$. The probability distribution that disables the policy is represented by the probability distribution 306, which corresponds to a transformation with $t_£=-1$. Disabling the policy implies that all file are eligible to be moved independent of the file's age. The probability distributions 308 and 310 are probability distributions that are derived by a transformation with $t_£=-0.5$ and $t_£=-0.25$. The probability of a file with an age of 70 days being moved is for example about 0.25 using probability distribution 310, while it is zero using probability distribution 308.

For $0<t_£<1$ where a maximum age $age_{max}$ has to be specified to calculate $(age_{max}-age)*t_£$ for the age of a file with p=1 while p is increasing linearly from 0 to 1 in the range of files with ages of [age, ..., $age_{max}$]. The probability distributions can also be specified in other ways. The important factor in the transformation being used is that a Boolean logic (true, false) is transformed into a probability which allows to differentiate on a file level which files comply more or less to a policy.

Attributes not being represented as a cardinal number like the file name can also be transformed into probabilities. This can be achieved by search pattern like ($\forall$file: matches(pattern, file)$\rightarrow p_i$=p). For instance, all files matching a pattern "*.jpg" would get a probability $p_i=p_{jpg}=0.5$ while other files matching a pattern "*.doc" would get a probability $p_i=p_{doc}=0.3$. This means that all image files will be migrated first before a migration of text document starts as the probability for $p_{jpg}<p_{doc}$.

If more than one policy is used for determined file to be eligible for migration, the transformation for each attribute in order to determine a probability p can be computed independently. This leads to a set of probabilities $P=\{p_1, p_2, ...\}$ associated to each individual file. From the subset of probabilities, a total probability $P_{total}$ has to be derived. $P_{Total}$ could for example be derived by the following rules:

if any probability of the subset of p equals to one, then $P_{Total}=1$.

if any probability of the subset of p equals to zero, then $P_{Total}=0$.

otherwise $P_{Total}=SUM\{p_0*w_0, \ldots, p_n*w_n\}_{file}/MAX(SUM(p_0*w_0, \ldots, p_n*w_n))$.

In the last case $P_{Total}$ is derived from a weighted sum of the subset of probabilities, wherein the weight factors are given by $w_0, \ldots, w_n$. The weight factors could for example by specified by a system administrator. The divisor is only needed to normalize $P_{Total}$ to $[0, \ldots, 1]$.

The probability $1-p_{file}$ can be interpreted as the business value $v_b$ of a file for being placed on the tier 1 storage or being moved to the less expensive tier 2 storage. While $v_b=[0.1]$ demands for placing a file on a certain storage tier, a $v_b=[0<v_b<1]$ allows the storage system to decide where the file is placed. The absolute value of $v_b$ allows to compare files and their business value allowing decisions of which files get moved.

Figure 4:
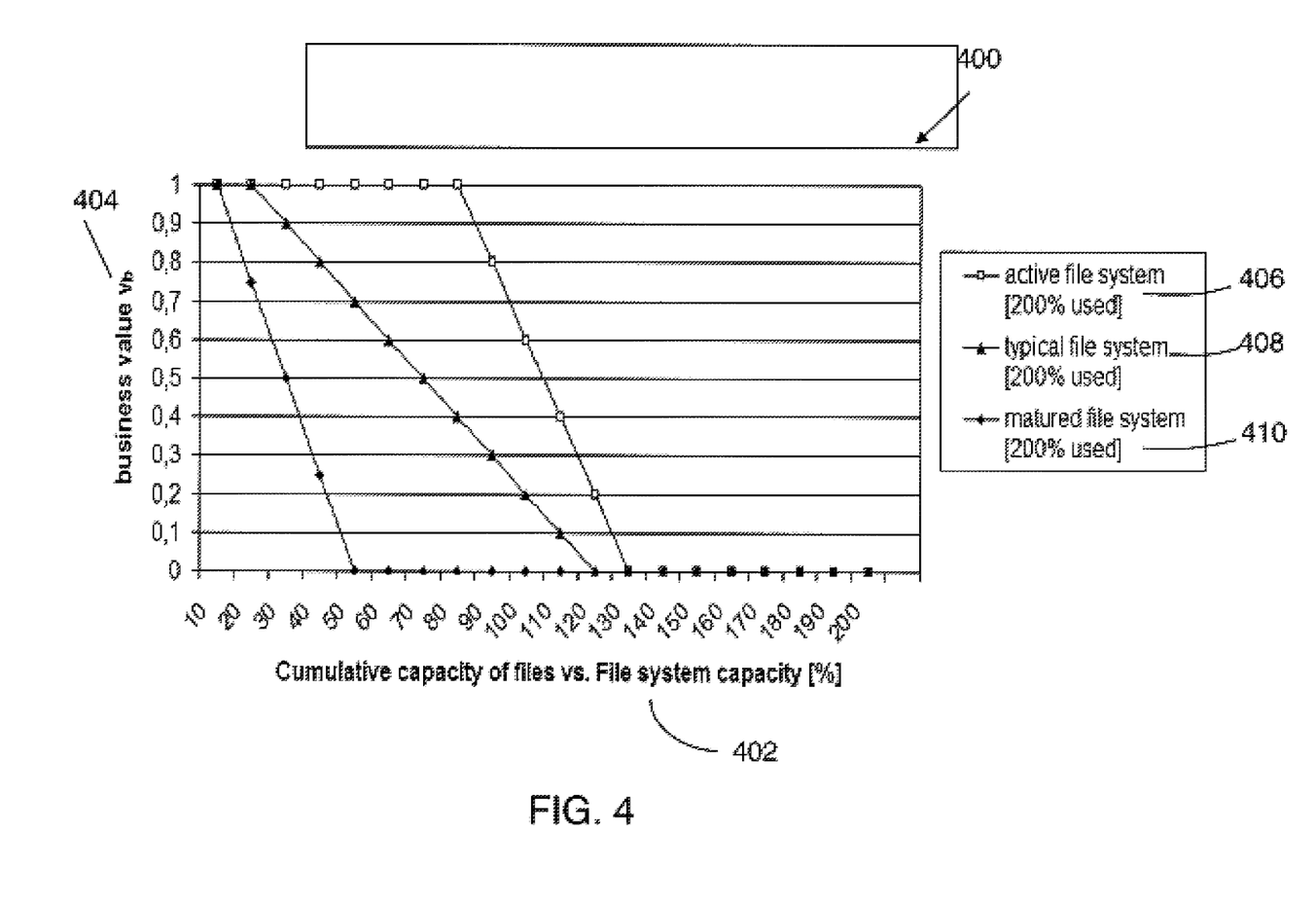
FIG. 4 shows distributions of business values.

FIG. 4 shows distributions of between values 400 for file systems used differently. The business value $v_b$ of a file can be interpreted as one minus the total probability P of a file ($v_b=1-P$). As the total probability, the absolute values of $v_b$ allow to compare files with respect to their business values and allows to make decisions which files should be moved. FIG. 4 shows that business value 404 of files of various file systems 406, 408, and 410 as a function of the cumulative capacity of file versus the file system capacity in percent 402.

While the file system 406 contains 80% of young file note eligible to be moved, the file system 408, contains only 30% of data note eligible to be moved. File system 406 is representative for a typical file system. File system 410 contains less than 20% of data that should not be moved while about 55% of all files are required to be moved.

Based on the presented concept of introducing a business value $v_b$ the threshold migration facility on an HSM-like storage management can be replaced by a new migration facility considering both concepts. Therefor, the business value $v_{b,threshold}$ needs to be defined representing the actual business value of the file which needs to be migrated to reduce the current capacity usage under the threshold itself. So the facility can follow an algorithm like the following:

WHILE ($v_{b,threshold}==1$) DO migrate the next file with $v_b=1$; END

WHILE ($0<v_{b,threshold} v_b<1$) DO migrate the next file with the highest $v_b$; END IF ($v_{b,threshold}==0$) THEN issue warning that a policy violation will happen;

The whole concept can be used in multi-tier storage environments like the examples above show the concept for a two-tier architecture. For every additional tier policies need to be defined an additional probability p needs to be computed for each object.

As the last extension of this concept a priority for each policy can be defined. The priority provides the ability to define an order amongst all policies. If the capacity of the first storage tier is occupied by files having a probability of 0 the only choice is for moving more data to avoid an out-of-space condition to deactivate a policy defining probability of zero for a set of files. If more than one policy exists defining a probability of zero the priority defined the order of deactivating policies for making those files becoming eligible for migration to the next storage tier. As this activity is usually not the behaviour intended by the administrator and only the last resort of action warnings should be issued in this case signalling the prevented out-of-space condition.

LIST OF REFERENCE NUMERALS

| | |
|---|---|
| 100 | Computer system |
| 102 | Microprocessor |
| 104 | computer program product |
| 106 | Volatile memory device |
| 108 | Non-volatile memory device |
| 110 | First storage space |
| 112 | Second storage space |
| 114 | Plurality of files |
| 116 | File |
| 118 | Attribute |
| 119 | Attribute |
| 120 | Policy |
| 121 | Policy |
| 122 | Policy-specific probability distribution |
| 123 | Policy-specific probability distribution |
| 124 | Policy-specific probability |
| 125 | Policy-specific probability |
| 126 | Total probability |
| 130 | Value for used storage space |
| 132 | High threshold value |
| 134 | Low threshold value |
| 136 | Weight factor |
| 138 | Weight factor |
| 140 | Monitor |
| 142 | Keyboard |
| 300 | Distribution |
| 302 | x axis referring to file age |
| 304 | y axis referring to probability |
| 306 | Probability distribution |
| 308 | Probability distribution |
| 310 | Probability distribution |
| 312 | Probability distribution |
| 400 | Distribution of business values |
| 402 | X-axis showing cumulative capacity of file versus the file system capacity in percent |
| 404 | Y-axis showing business value |
| 406 | File system |
| 408 | File system |
| 410 | File system |

What is claimed is:

1. A method of managing a storage system, said storage system comprising a first storage space and a second storage space, said first storage space comprising a plurality of files, each file of said plurality of files being characterized by at least one attribute, said storage system further assigning a policy to each attribute, said method comprising:

determining a policy-specific probability distribution for each policy;

determining a policy-specific probability for each file by use of said policy-specific probability distribution;

determining a total probability for each file by use of each policy-specific probability;

determining said total probability by adding the policy-specific probabilities of each file, wherein each policy-specific probability is multiplied by a predefined weight factor, and wherein the total probability is normalized by a factor so that the total probability lies between 0 and 1;

moving each file of said plurality of files having a total probability equal to 1 from said first storage space to said second storage space;

moving files of said plurality of files having a total probability between 0 and 1, if the storage space used on said first storage space reaches a high threshold value until a low threshold value is reached, said low threshold value and said high threshold value being predefined.

2. The method according to claim 1, said method further comprising:

determining said total probability of a file is 1 if one policy-specific probability of said file is 1;

determining said total probability for a file is 0, if one policy-specific probability of said file is 0.

3. The method according to claim 1, said method further comprising moving files of said plurality of files, if the storage space used on said first storage space reaches a high threshold value until a low threshold value is reached, and if the total probability of all files comprised in said plurality of files is equal to 0.

4. The method according to claim 1, wherein files with the higher total probability are moved before files with the lower total probability.

5. The method according to claim 1, wherein the total probability of a file equals the policy-specific probability of said file, if only one attribute characterizes said file.

6. The method according to claim 1, wherein the attribute refers to the age of a file or to the size of a file.

7. The method according to claim 1, wherein the policy-specific probability distribution for each policy is determined by a transformation, wherein said transformation is characterized by a relational number, wherein the relational number lies in the range between minus one (−1) and plus one (+1), inclusively.

8. The method according claim 1, wherein the attribute refers to a file name, and wherein the policy-specific probability distribution of the policy that is assigned to the file name is predefined.

9. The method according to claim 1, wherein a business value for a file is given by one minus the total probability of said file, and wherein said business value is used to compare files with each other.

10. The method according to claim 1, wherein said first storage space is a tier 1 storage and wherein said second storage space is a tier 2 storage.

11. A computer system for managing a storage system, wherein the storage system comprises a memory device having a first storage space and a second storage space, said first storage space comprising a plurality of files, each file of said plurality of files being characterized by at least one attribute, wherein each attribute has a corresponding storage system assigned policy, the computer system comprising:

a computer program product comprising instructions for managing the storage system; and a microprocessor in communication with the computer program product, said computer system capable of executing the instructions to perform a method comprising:

determining a policy-specific probability distribution for each policy;

determining a policy-specific probability for each file by use of said policy-specific probability distribution;

determining a total probability for each file by use of each policy-specific probability;

determining said total probability by adding the policy-specific probabilities of each file, wherein each policy-specific probability is multiplied by a predefined weight factor, and wherein the total probability is normalized by a factor so that the total probability lies between 0 and 1;

moving each file of said plurality of files having a total probability equal to 1 from said first storage space to said second storage space;

moving files of said plurality of files having a total probability between 0 and 1, if the storage space used on said first storage space reaches a high threshold value until a low threshold value is reached, said low threshold value and said high threshold value being predefined.

12. The computer system according to claim 11, wherein said method further comprises:

determining said total probability of a file is 1 if one policy-specific probability of said file is 1;

determining said total probability for a file is 0, if one policy-specific probability of said file is 0.

13. The computer system according to claim 11, wherein said method further comprises:

moving files of said plurality of files, if the storage space used on said first storage space reaches a high threshold value until a low threshold value is reached, and if the total probability of all files comprised in said plurality of files is equal to 0.

14. The computer system according to claim 11, wherein files with the higher total probability are moved before files with the lower total probability.

15. The computer system according to claim 11, wherein the total probability of a file equals the policy-specific probability of said file, if only one attribute characterizes said file.

16. A computer program product component for managing a storage system, the storage system comprising a memory device having a first storage space and a second storage space, said first storage space comprising a plurality of files, each file of said plurality of files being characterized by at least one attribute, wherein each attribute has a corresponding storage system assigned policy, wherein the computer program product component comprises instructions readable by a microprocessor for execution by the microprocessor for performing a method comprising:

assigning a policy to each attribute;

determining a policy-specific probability distribution for each policy;

determining a policy-specific probability for each file by use of said policy-specific probability distribution;

determining a total probability for each file by use of each policy-specific probability;

moving each file of said plurality of files having a total probability equal to 1 from said first storage space to said second storage space;

moving files of said plurality of files having a total probability between 0 and 1, if the storage space used on said first storage space reaches a high threshold value until a low threshold value is reached, said low threshold value and said high threshold value being predefined.

17. The computer program product according to claim 16, wherein said method further comprises:

determining said total probability of a file is 1 if one policy-specific probability of said file is 1;

determining said total probability for a file is 0, if one policy-specific probability of said file is 0;

determining said total probability by adding the policy-specific probabilities of each file, wherein each policy-specific probability is multiplied by a predefined weight factor, and wherein the total probability is normalized by a factor so that the total probability lies between 0 and 1.

18. The computer program product according to claim 16, wherein said method further comprises:

moving files of said plurality of files, if the storage space used on said first storage space reaches a high threshold value until a low threshold value is reached, and if the total probability of all files comprised in said plurality of files is equal to 0.

19. The computer program product according to claim 16, wherein files with the higher total probability are moved before files with the lower total probability.

20. The computer program product according to claim 16, wherein the total probability of a file equals the policy-specific probability of said file, if only one attribute characterizes said file.

* * * * *